Aug. 30, 1966  T. E. KIRK ETAL  3,270,331
FAULT INDICATOR CIRCUIT FOR DIODE-RECTIFIED GENERATOR
Filed June 27, 1963  2 Sheets-Sheet 1

INVENTORS
THOMAS E. KIRK
WILLIAM D. WORRELL
BY C. R. Meland
ATTORNEY

INVENTORS
THOMAS E. KIRK
WILLIAM D. WORRELL
BY C. R. Meland
ATTORNEY

United States Patent Office 3,270,331
Patented August 30, 1966

3,270,331
FAULT INDICATOR CIRCUIT FOR DIODE-RECTIFIED GENERATOR
Thomas E. Kirk and William D. Worrell, Anderson, Ind., assignors to General Motors Corporation, Detroit, Mich., a corporation of Delaware
Filed June 27, 1963, Ser. No. 291,078
11 Claims. (Cl. 340—248)

This invention relates to a fault indicating system for a diode-rectified generator power combination which may be used to supply the electrical loads on a motor vehicle.

It is well-known in the diode-rectified generator power combination art to provide an indicating system which will indicate whether or not the diode-rectified generator has an output voltage. One system of this type is shown in the Raver patent, 2,817,830, and another system is shown in the Larson, et al. patent, 3,022,456. In these patents, an indicator light will become incandescent when the output voltage of the diode-rectified generator drops below some predetermined value. In the Larson, et al. patent, a system is illustrated wherein an over-voltage condition will also be indicated, that is, a condition where the output voltage of the diode-rectified generator rises above the desired regulated output voltage.

In contrast to the systems illustrated in the above-noted Raver and Larson, et al. patents, it is an object of this invention to provide a fault indicating system which will not only indicate whether or not the generator-diode combination has an output voltage but will also indicate whether or not one or more of the diodes is faulty. In carrying this object forward, a bridge network is provided which is comprised of resistors and which has an input voltage that is proportional to the output voltage of a bridge rectifier fed by the generator. An indicating device such as a lamp is connected across two terminals of the bridge and one terminal of the bridge is connected with the neutral of a three phase Y-connected winding of the generator. The voltage developed at the neutral of the three phase Y-connected winding provides a signal to the bridge network which will indicate whether or not there are any shorted diodes in the bridge rectifier as well as indicating whether or not the generator-diode combination has an output voltage.

Another object of this invention is to provide a fault indicating system for an alternator-diode power combination wherein the indicating system is capable of indicating an over-voltage condition, an under-voltage condition and a condition where one of the diodes of a bridge rectifier is faulty.

A further object of this invention is to provide a fault indicating system in an alternator-diode combination wherein the voltage developed at the neutral point of a Y-connected output winding of the alternator is used as a signal voltage to determine wherether or not there are any faulty diodes in the bridge rectifier circuit.

Further objects and advantages of the present invention will be apparent from the following description, reference being had to the accompanying drawings wherein preferred embodiments of the present invention are clearly shown.

Figure 1:
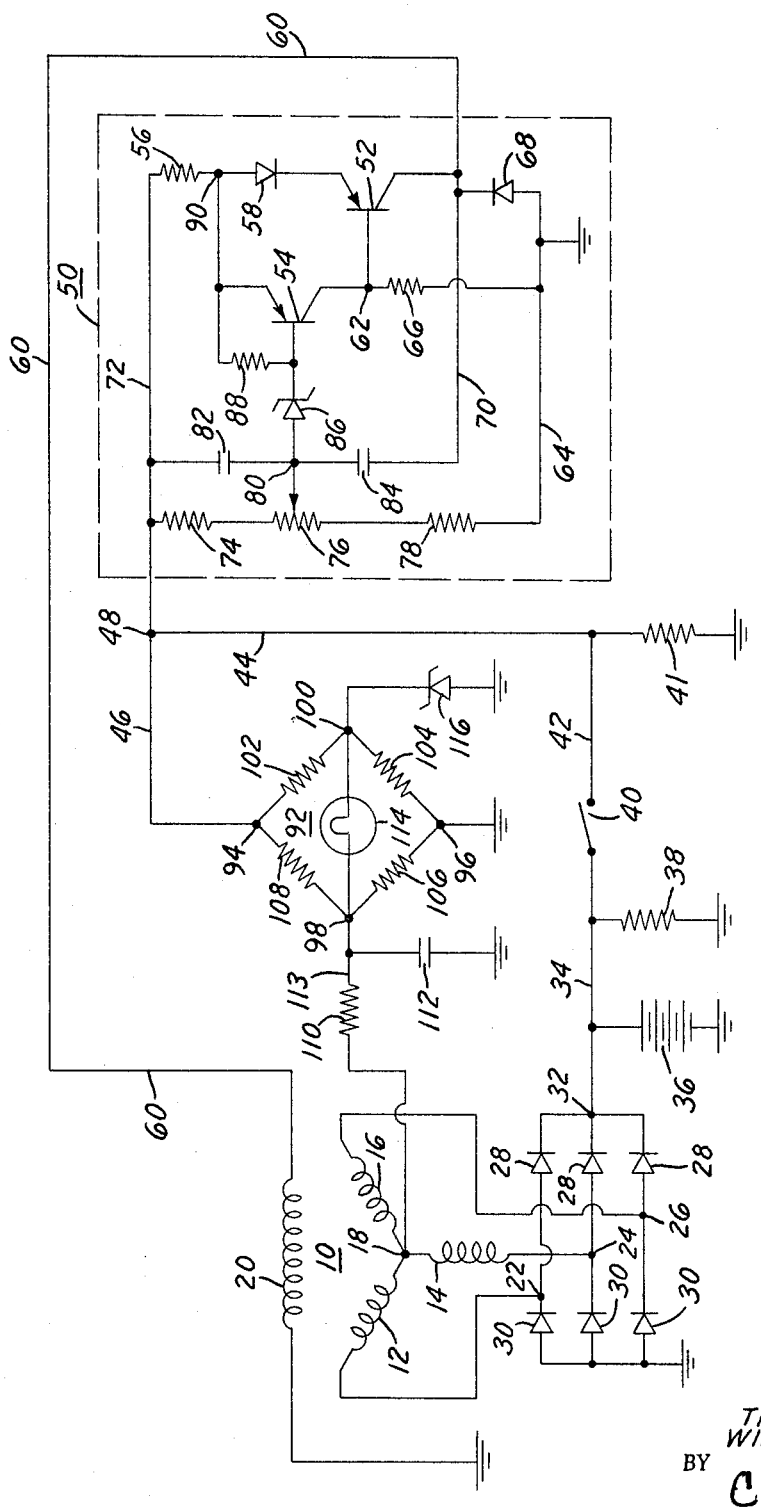
FIGURE 1 is a schematic circuit diagram of an alternator-diode power combination having a fault indicating system made in accordance with this invention.

Referring now to the drawings and more particularly to FIGURE 1, the reference numeral 10 generally designates an alternating current generator which has a three phase Y-connected output winding formed of phase windings 12, 14 and 16. The phase windings are connected together at the neutral point 18 and the alternator has a field winding 20 which controls the output voltage of the Y-connected output winding in accordance with the amount of current flowing through the field winding 20.

The phase windings 12, 14 and 16 are connected with the input terminals 22, 24 and 26 of a three phase full wave bridge rectifier network which is comprised of diodes 28 and 30. One side of the diodes 30 are grounded whereas one side of the diodes 28 are commonly connected with a junction 32. It will be appreciated that the output voltage of the bridge rectifier is taken between junction 32 and ground. It will also be appreciated that the generator and bridge rectifier combination can be built into a single unit or can be separate units all of which is well known to those skilled in the art.

The positive D.C. output terminal of the bridge rectifier network is connected with a conductor 34. The conductor 34 feeds a storage battery 36 which is connected between conductor 34 and ground. The conductor 34 also feeds an electrical load which is designated by reference numeral 38. The conductor 34 is connected to one side of a manually operable switch 40, the opposite side of this switch being connected with conductor 42. The conductor 42 is connected with conductor 44 which in turn is connected with conductor 46 at junction 48.

The electrical system of this invention includes a voltage regulator which is designated in its entirety by the reference numeral 50 and which is of a type shown in Hetzler Patent 2,945,174. This regulator is a transistor voltage regulator and includes PNP junction transistor 52 and 54. The emitter electrode of transistor 52 is connected in series with a resistor 56 and a diode 58. The collector electrode of transistor 52 is connected with a conductor 60 which is connected to one side of the field winding 20.

The base electrode of transistor 52 is connected with junction 62 and this junction is connected with the collector of transistor 54 and to a grounded conductor 64 through resistor 66. A transient suppressing diode 68 connects the grounded conductor 64 and a conductor 70.

The junction 48 is connected with a positive conductor 72 of the transistor voltage regulator 50. A voltage divider network comprised of resistor 74, variable tapped resistor 76 and resister 78 is connected across the positive and negative conductors 72 and 64. The tap point of the variable resistor 76 is connected with a junction 80. The junction 80 is connected to capacitors 82 and 84 and is connected to one side of a Zener diode 86. The opposite side of the Zener diode is connected with the base electrode of transistor 54 and a resistor 88 connects the emitter and base electrodes of transistor 54. The emitter of transistor 54 is connected to junction 90 as is clearly apparent from the drawings.

The indicating sensing device of this invention which senses faulty conditions of the electrical system includes an indicating bridge which is generally designated by reference numeral 92. This indicating bridge has terminals 94 and 96. The terminal 94 is connected with conductor 46 whereas the terminal 96 is grounded. The bridge also has terminals 98 and 100. The various terminals of the bridge are connected by resistors 102, 104, 106 and 108. The resistors 102 and 104 are selected to have approximately the same resistance so that the potential at junction 100 will be approximately one half the potential appearing between junctions 94 and 96. Since the junctions 94 and 96 are connected across the D.C. output terminals 32 and ground of the bridge rectifier, the potential of junction 100 will normally be one half of the output voltage of the bridge rectifier.

The resistance value of resistor 108 must be either greater or less than the resistance value of resistor 106. It will be assumed in the discussion hereinafter that the resistor 108 has a resistance which is greater than the resistance of the resistor 106.

The junction 98 of the indicating bridge network is connected with the neutral point 18 of the alternator 10 through a resistor 110. A capacitor 112 is connected between conductor 113 and ground. The resistor 110 and the capacitor 112 form a filter network connected between neutral 18 and the junction 98 of the indicating bridge.

A signal lamp 114 is connected directly across the terminals 98 and 100 of the bridge 92. A Zener diode 116 is connected between the terminal 100 of the bridge 92 and ground. The breakdown voltage of the Zener diode is selected to be a voltage which is approximately one half of the normal regulated voltage that appears between junction 32 and ground. The term regulated voltage means the desired voltage which is to be maintained by the voltage regulator 50 and in a twelve volt system, this regulated voltage may be approximately 14 volts.

When the switch 40 is closed, the power system of this invention will be put into operation. Where the alternator is driven by an engine on a motor vehicle and the engine is not running, the initial closing of the switch 40 will cause the field winding 20 to be energized from battery 36, conductor 34, closed switch 40, conductor 42, conductor 44, junction 48, conductor 72, resistor 56, junction 90, diode 58, the emitter-collector circuit of transistor 52, through conductor 60, through field winding 20 and then to ground. With the engine running the generator builds up and the same circuit as has just been described will energize the field winding 20 in accordance with the output voltage of the bridge rectifier from junction 32. The voltage regulator 50 will sense the output voltage of the bridge rectifier since the voltage divider network 74, 76 and 78 is connected between conductor 72 and ground. The voltage regulator operates by switching the transistor 52 on and off to vary the amount of current flowing through the field winding 20 in accordance with the amount of voltage appearing between junction 32 and ground. In a normal operating system, the voltage appearing between junction 32 and ground will be maintained substantially constant at approximately 14 volts in a 12 volt system by the transistor voltage regulator 50.

In describing the indicating function of this circuit, let it first be assumed that the alternator-diode combination has no output voltage as when the alternator is not being driven or when there is some other fault in the circuit. When there is no output voltage from the bridge rectifier, the voltage of battery 36 is impressed across the terminals 94 and 96 of the resistive bridge 92. Since resistors 102 and 104 have approximately the same resistance value, the junction 100 will be at a potential that is approximately one half battery voltage. Since the resistance value of resistor 108 is greater than the resistance value of resistor 106, the junction 98 will have a potential which is lower than the junction 100. As a result, current will flow from junction 94, through resistor 102, through junction 100, through the signal lamp 114 and then through the resistor 106 and junction 96 to ground. As a result of this, the signal lamp will be lighted which will indicate that the alternator-rectifier combination does not have an output voltage.

Assume now that there is no fault in the circuit and that the alternator-diode combination has built up to its regulated output voltage. The output voltage of the bridge rectifier is impressed across junctions 94 and 96. As a result, the junction 100 has a potential which is approximately one half the output voltage of the bridge rectifier. The junction 98, however, now has a potential which is substantially equal to the potential of the neutral point 18. This potential as the generator builds up will come up to about one half the regulated potential appearing between junction 32 and ground and as a result of this, there will be substantially equal potentials at junctions 98 and 100 and the signal lamp 114 will therefore be extinguished.

Assuming now that one of the diodes 28 has become shorted, the neutral point 18 will have a potential which is substantially identical to the potential of junction 32 which is substantially identical to the regulated output voltage appearing between junction 32 and ground. The terminal 98 of the bridge 92 will not be at substantially one-half the regulated potential and since the junction 100 is held at substantially one-half the regulated potential, current will flow between junctions 98 and 100 and through the lamp 114 causing the lamp to light. This indicates a fault in the system which in this case is a shorted diode 28.

If one of the diodes 30 should becomes shorted, the neutral 18 instead of having a voltage which is substantially identical to one-half the regulated output voltage of the bridge rectifier has a voltage or potential which is substantially ground potential. As a result of this, the terminal 98 of the bridge 92 has substantially ground potential and the junction 100 which has one half the regulated potential is now at a higher potential. It therefore can be seen that current will flow from junction 100 to junction 98 through the lamp 114 and the lamp once more becomes lighted indicating a fault in the system. The fault that now is indicated is the shorting of one of the diodes 30.

As pointed out above, the transistor regulator 50 when in normal working condition will maintain the voltage between junction 32 and ground at substantially a constant value. If a fault should occur in the transistor regulator which will cause an abnormal high output voltage condition, this condition will be indicated by the bridge network 92. Thus if transistor 52 should become shorted, an abnormally high current will flow through the field 20 and an abnormally high output voltage will result which is considerably above the desired regulated voltage. This condition will be indicated by the bridge network 92.

Where the abnormally high output voltage occurs, it is seen that the potential of junction 100 will be maintained substantially constant with respect to ground due to the provision of the Zener diode 116. This voltage will be approximately one half the desired regulated output voltage which is to be maintained by the transistor regulator 50. If the output voltage goes out of control, the junction 100 remains at substantially one half the desired regulated voltage but the voltage of the junction 98 will exceed one half of the desired regulated output voltage. As a result, current will flow through the lamp 114 from terminal 98 toward terminal 100 and the lamp will therefore become lit to indicate a fault in the system.

It can be seen from the foregoing that the indicating bridge 92 will indicate whether or not the generator 10 has an output voltage, will indicate a condition where the generator 10 has an abnormally high output voltage, and will indicate conditions where diodes 28 and 30 become shorted.

The resistor 110 and the capacitor 112 filter any ripple obtained at the neutral point 18 so that there is only a negligible amount of variation of the potential at terminal 98 with increases in current supplied to the loads 38 and 41.

Figure 2:
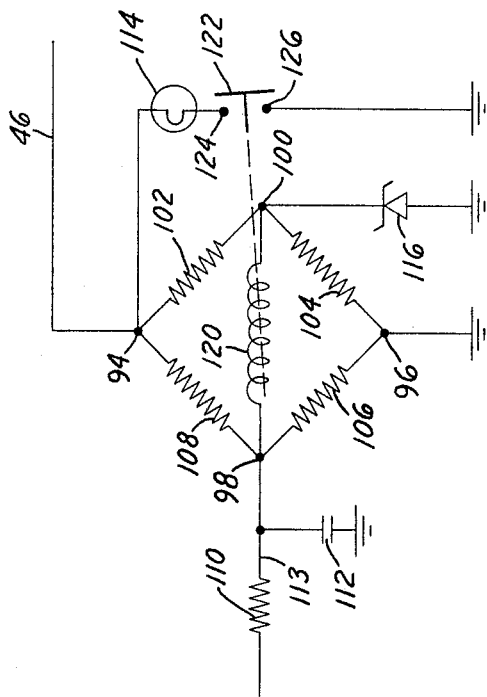
FIGURE 2 is a schematic circuit diagram of a circuit that may be substituted for a portion of the circuit illustrated in FIGURE 1.

Referring now more particularly to FIGURE 2, a schematic circuit diagram of an indicating bridge is shown which can be substituted for the bridge 92 in the system of FIGURE 1. The same reference numerals have been used in FIGURE 2 to identify parts which are identical to those shown in FIGURE 1. It is seen that the difference between the indicating bridge of FIGURE 2 and the indicating bridge of FIGURE 1 is that a relay coil 120 is connected between the terminals 98 and 100 rather than a signal lamp. The relay coil shifts a contactor 122 which can connect the fixed contacts 124 and 126. Contact 126 is grounded whereas contact 124 is connected with signal lamp 114. The opposite side of the signal lamp 114 is connected to terminal 94.

In a system of FIGURE 2, the relative potentials of terminals 98 and 100 will vary in the same manner as described for the system shown in FIGURE 1 as various faults develop in the power system. In the system of FIGURE 2, the relay coil 120 will be energized to close the contacts 124 and 126 whenever a difference of potential exists between terminals 98 and 100. As a result, the lamp 114 will be energized in the same manner as it is in FIGURE 1 with the exception that the lamp is now controlled by a relay rather than being directly connected across terminals 98 and 100.

Figure 3:
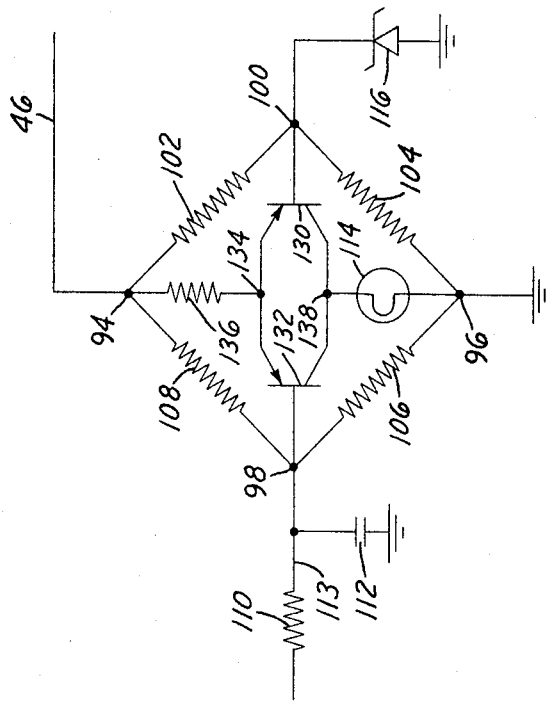
FIGURE 3 is a schematic circuit diagram of a circuit which is interchangeable with a portion of the circuit illustrated in FIGURE 1 and interchangeable with the circuit illustrated in FIGURE 2.

The system illustrated in FIGURE 3 can be substituted for the sensing bridge 92 shown in FIGURE 1 and is interchangeable with the bridge shown in FIGURE 2. In FIGURE 3, the same reference numerals have been used as we used in FIGURE 1 to identify the same parts in each figure. The system of FIGURE 3 differs from the indicating bridges of FIGURES 1 and 2 in that a pair of PNP junction transistors 130 and 132 are provided. The emitter electrodes of these two transistors are connected with junction 134 and an emitter bias resistor 136 connects the terminal 94 and the junction 134. The collector electrodes of transistors 130 and 132 are connected together at junction 138 and the signal lamp 114 connects the junction 138 with the terminal 96. The base electrode of transistor 130 is connected with terminal 100 whereas the base electrode of transistor 132 is connected with terminal 98.

In the circuit of FIGURE 3 when the potential of terminals 98 and 100 are substantially equal, both transistors 130 and 132 are turned off in their emitter-collector circuits so that there is no current flow through signal lamp 114 and the signal lamp is therefore not lit. When the potential at terminal 98 exceeds the potential of terminal 100, the transistor 130 will be switched on in its emitter-collector circuit and current will therefore flow through this transistor and through the indicating lamp 114 to cause this lamp to become lit. When the potential of terminal 100 exceeds the potential of terminal 98, the transistor 132 is biased on while the transistor 130 is turned off so that current flows through the emitter-collector circuit of transistor 132 and through the lamp 114 to light the lamp. It will be appreciated from the foregoing that the lamp 114 is again lit by the difference in potential of terminals 98 and 100 which occur in the same manner as described in FIGURE 1. In FIGURE 3, however, a completely static circuit is provided since the transistors provide the current path for the lamp 114 in accordance with the potential conditions of terminals 98 and 100.

Although the voltage regulator 50 is shown as a static type and more particularly a transistor voltage regulator, it is within the concepts of this invention to use other types of regulators. Thus the regulator 50 may be of a type that uses controlled rectifiers or could be of any other type that is capable of controlling the output voltage of the generator 10 in accordance with the voltage appearing between junction 32 and ground. The term voltage regulator therefore as used in the appended claims is intended to cover the specific transistor voltage regulator 50 and any other regulator that will perform the same function as regulator 50.

In each of the embodiments shown in the figures of this drawing, a Zener diode 116 is shown connected between junction 100 and ground. It will be appreciated by those skilled in the art that the Zener diode 116 could be eliminated if it is desired that the indicating system of this invention not indicate the over voltage condition.

While the embodiments of the present invention as here- in disclosed constitute preferred forms, it is to be understood that other forms might be adopted.

What is claimed is as follows:

1. In combination, an alternating current generator having a three phase Y-connected output winding, a three phase full wave bridge rectifier network having D.C. output terminals connected with said three phase output winding, a bridge indicating network having first, second, third and fourth terminals, means connecting the first and third terminals of said bridge indicating network across the D.C. output terminals of said bridge rectifier network, means connecting the neutral point of said three phase output winding with the fourth terminal of said bridge indicating network, and an electrically energizable means connected across the second and fourth terminals of said bridge indicating network.

2. The combination according to claim 1 wherein the electrical energizable means is a relay coil.

3. In combination, an alternating current generator having a three phase Y-connected output winding, a three phase full wave bridge rectifier network connected with said output winding having a pair of D.C. output terminals, a bridge indicating network, means connecting terminals of said bridge indicating network with the neutral point of said three phase output winding and with the pair of D.C. output terminals of said bridge rectifier network, and an electrically energizable means connected with said bridge indicating network.

4. In combination, an alternating current generator having a three phase Y-connected output winding, a three phase full wave bridge rectifier network connected with said output winding having a pair of D.C. output terminals, a bridge indicating network having first, second, third and fourth terminals, means connecting the D.C. output terminals of said bridge rectifier network with said first and third terminals of said bridge indicating circuit, first and second transistors each having emitter, collector and base electrodes, means connecting the emitter electrodes of said transistors to said first terminal of said bridge indicating circuit, means connecting the collector electrodes of said transistors to a junction, an electrically energizable indicating device connected between said junction and the third terminal of said bridge indicating network, means connecting the base electrodes of said transistors respectively with the second and fourth terminals of said bridge indicating network, and means connecting the neutral of said three phase winding with said fourth terminal of said bridge indicating network.

5. In combination, an alternating current generator having a three phase Y-connected output winding, a three phase full wave bridge rectifier network connected with said output winding having a pair of D.C. output terminals, bridge indicating network having first, second, third and fourth terminals, means connecting said D.C. output terminals of said bridge rectifier network across said first and third terminals of said bridge indicating network, means connecting the fourth terminal of said bridge indicating network with the neutral of said three phase output winding, a Zener diode connected between the second terminal of said bridge indicating network and one D.C. terminal of said bridge rectifier network, and an electrically energizable indicating means connected between said second and fourth terminals of said bridge indicating network.

6. In combination, an alternating current generator having a three phase Y-connected output winding, a three phase full wave bridge rectifier network connected with said output winding having a pair of D.C. output terminals, a bridge indicating network having first, second, third and fourth terminals, resistors connected respectively between the terminals of said bridge indicating network, means electrically connecting the D.C. output terminals of said bridge rectifier network across said first and third terminals of said bridge indicating network, means connecting the fourth terminal of said bridge indicating network with the neutral of said three phase output winding, an electrically energizable indicating device connected across said second and fourth terminals of said bridge indicating network, the resistors connected respectively between said first and second terminals and between said second and third terminals of said bridge indicating network having substantially equal resistance values, the resistors connected between said first and fourth terminals and between said fourth and third terminals of said bridge indicating network having unequal resistance values.

7. The combination according to claim 6 wherein the means that connects the neutral of the three phase output winding and the fourth terminal of the bridge indicating network includes a filtering network.

8. In combination, an alternating current generator having a three phase Y-connected output winding, a three phase full wave bridge rectifier network connected with said output winding having a pair of D.C. output terminals, a control means, electrically energizable means connected with said control means, and means for applying signal voltages to said control means from the output terminals of said bridge rectifier network and from the neutral of said three phase output winding.

9. The combination according to claim 8 wherein the control means is a bridge network comprised of four resistors.

10. The combination according to claim 8 wherein the electrically energizable means is a signal lamp.

11. An indicator circuit for use in indicating faults in a power generating system that includes a three phase Y-connected output winding connected with a three phase full wave bridge rectifier network comprising, a bridge network having first, second, third and fourth terminals, resistors connected respectively between the terminals of said bridge network, and electrically energizable indicating means connecting said second and fourth terminals of said bridge network, said first and third terminals of said bridge network being adapted to be connected across the D.C. output terminals of a bridge rectifier network, said fourth terminal of said bridge network being adapted to be connected with a neutral of a three phase Y-connected output winding.

References Cited by the Examiner

UNITED STATES PATENTS

| | | | |
|---|---|---|---|
| 1,257,440 | 2/1918 | Zehden | 340—285 |
| 2,943,305 | 6/1960 | Walker | 340—248 X |
| 3,022,456 | 2/1962 | Larson et al. | 320—48 X |
| 3,134,068 | 5/1964 | Feltman | 321—5 X |

NEIL C. READ, *Primary Examiner.*

D. K. MYER, *Assistant Examiner.*